United States Patent Office 3,037,917
Patented June 5, 1962

3,037,917
METHOD OF PRODUCING TETRACYCLINE
Karel Čulík, Roztoky, near Prague, Miloš Herold, Prague-Sporilov, Josef Palkoska, Prague, Eduard Bělík, Roztoky, near Prague, and Jaroslav Dašek, Banska Bystrica, Czechoslovakia, assignors to Spofa, sdruzeni podniku pro zdravotnickou vyrobu, Prague, Czechoslovakia
No Drawing. Filed Apr. 1, 1959, Ser. No. 803,346
Claims priority, application Czechoslovakia Apr. 10, 1958
4 Claims. (Cl. 195—80)

Tetracycline, an important antibiotic of the tetracycline series, is usually produced by catalytic dechlorination of chlorotetracycline, described e.g. in U.S. patent specification No. 2,699,054. Said method yields only about 60 percent of the theoretical amount. The starting material and the required equipment are expensive.

There was therefore often tried to elaborate another method based on a fermentation process, in which microorganisms producing usually chlorotetracycline could be used. It is known that some progress has been achieved either by removing chlorine ions from the culture medium or by driving them out by excessive bromine anions, see e.g. Ogawa, Ito, J. Agr. Chem. Soc. Japan, 30, 123–125; British patent specifications Nos. 773,453, 775,115, 781,-843; Swiss patent specification No. 324,085; U.S. patent specification No. 2,734,018.

The removing chlorine anions from cultivation medium or from its nutrient components is laborious and expensive. Moreover the medium is thereby deprived of important substances which are necessary for reaching high yields of the desired product.

According to another known process the chlorine anions are driven out from the metabolism of *Streptomyces aureofaciens* and *Streptomyces viridifaciens* by adding a surplus of bromine anions in form of easily water-soluble salts containing ionogenbound bromine, e.g. of sodium or potassium bromines. This method is, however, successful only if said physiologically strange ions are added in abundance. Thus the forming of the undesired chlorotetracycline is pushed back, but simultaneously the overall yield of antibiotics is decreased by inhibitive influence of bromine ions present in considerable concentration.

Object of the present invention is a new method by which tetracycline is produced by usual microorganisms in high yields of about 90 percent or more (computed on all antibiotics present in the fermentated medium). The invention consists in adding non-toxic organic compounds with covalent-bound bromine or forming them in situ by adding elementary bromine to the medium or to its individual components possessing some degree of unsaturation so that bromine may be readily added without forming bromine anions. As organic brominated compounds may be used e.g. sodium or ammonium bromo-methane sulphonates, tetrabromophenolphthaleine or any other non-toxic brominated organic compounds with covalent-bound bromine. The maximal amount of such bromine compounds does not exceed 0.5 percent of the medium.

Organic bromine compounds, either added as such or formed in the culture medium by the reaction of nutrient components with elementary bromine, are antimetabolites of chlorides. In their presence the microorganisms, forming usually chlorotetracycline, produce almost exclusively tetracycline.

The new method according to the invention possesses the advantage that it is not necessary to remove chlorides from nutrients. This advantage is both economical and technical, the presence of some minimal amount of chlorides being substantial for reaching high antibiotic yields. The small amount of added bromine compounds is not noxious for the producing microorganism.

The application of elementary bromine is particularly advantageous requiring no separate operation. Moreover, bromine is the cheapest bromine raw material, much less expensive than pure sodium or potassium bromine.

The invention is further illustrated by following non-limitative examples.

Example 1

1000 litres of a nutrient medium of following composition:

|  | Percent |
|---|---|
| Cane sugar | 4.0 |
| Soja flour | 3.0 |
| Calcium carbonate | 0.5 |
| Sodium sulphate | 0.2 |
| Molasses | 0.1 |
| Ammonium sulphate | 0.5 |
| Brewery yeast | 0.2 |
| Corn-steep liquor (dry substance) | 0.2 |
| Soja-bean oil | 0.2 | were inoculated with spores of a producing strain of Streptomyces in an incubation tank, built from anticorrosive material. Before the sterilization 0.01 percent of elementary bromine was added. The sterilization was accomplished by heating to 115° C. during 40 minutes. The cultivation was carried out during 26 hours at 29° C. under aseptic condition. The culture was aerated with 0.5 volume of air in a minute.

The culture thus obtained was used for inoculating 9000 litres of a nutrient medium of following composition:

| | | |
|---|---|---|
| Cane sugar | percent | 5.0 |
| Soja flour | do | 4.0 |
| Ammonium sulphate | do | 0.5 |
| Calcium carbonate | do | 1.0 |
| Sodium sulphate | do | 0.2 |
| Molasses | do | 0.1 |
| De-bittered brewery yeast | do | 0.3 |
| Corn-steep liquor (dry substance) | do | 0.1 |
| Soja-bean oil | do | 0.2 |
| Cobaltous chloride | grams | 30 |
| Bromine | percent | 0.1 |

The nutrient medium was sterilized during 40 minutes at 115° C. The cultivation lasted 72 hours at 28–30° C., the medium was aerated with 0.5–0.8 volume of air in a minute, and stirred with 120 r.p.m. The yield was 2400 units per ml., containing 91 percent of tetracycline and 9 percent of chlorotetracycline.

Example 2

The cultivation and fermentation was carried out according to Example 1, only instead of elementary bromine added to the medium a soja flour was used, which was before reacted with elementary bromine in an amount of 10 kg. bromine to 360 kg. of soja flour during two hours in an aqueous suspension at 50° C. The yield was 2200 units per ml., containing 89 percent of tetracycline and 11 percent of chlorotetracycline.

Example 3

The cultivation and fermentation was carried out like in Example 1, only bromine was added in form of addition compounds with a mixture of unsaturated fats and oils, containing fish-oil, sunflower-oil, linseed-oil soja-bean oil and peanut-oil in approximatively equal amounts. Said mixture of addition compounds was prepared by reacting of 10 kg. elementary bromine with 100 kg. fat and oil mixture. The brominated mixture was then refined by shaking out with alkaline hydroxide containing methanol. The brominated fat mixture was added at first in an amount of 0.2 percent, and after hours in an amount of 5 kg. in each 5 hours. The yield of antibiotics was 3100 units per ml., containing 92 percent of tetracycline and 8 percent of chlorotetracycline.

Example 4

In a process according to Example 1 elementary bromine was added in an amount of 0.08 percent to following nutrient components:

|  | Percent |
|---|---|
| Calcium carbonate | 1.1 |
| Corn-steep liquor (dry substance) | 0.1 |
| Molasses | 0.1 |
| Yeast | 0.3 |
| Water | 10.0 |

(computed on the medium according to Example 1 as a whole).

The mixture was boiled for 20 minutes and then added to the remaining nutrients. The yield of antibiotics was 3040 percent, containing 91 percent of tetracycline and 9 percent of chlorotetracycline.

Example 5

In a process according to Example 1 instead of elementary bromine ammonium bromo-methane sulphonate was added in total amount of 0.1 percent during first 45 hours of fermentation. The yield amounted to 3050 units per ml., containing 93 percent of tetracycline and 7 percent of chlorotetracycline.

Example 6

0.05 percent of tetrabromophenolphthaleine was added in the process described in foregoing examples. The yield of antibiotics was 3050 units per ml., containing 91.5 percent of tetracycline and 8.5 percent of chlorotetracycline.

Example 7

The process according to Example 1 was carried out without adding bromine or organic bromine compounds. The yield of antibiotics was 2520 units per ml., containing 91 percent of chlorotetracycline and only 9 percent of tetracycline.

We claim:

1. In a method of producing tetracycline, the step of cultivating a microorganism selected from the group consisting of *Streptomyces aureofaciens* and *Streptomyces viridifaciens* in a nutrient medium containing a non-toxic organic bromine compound in which the bromine is linked to the organic molecule by a covalent bond and being selected from the group consisting of bromo-methane sulfonates, tetrabromophenolphthalein, brominated bean oil and flour, brominated fish oil, brominated sunflower oil, brominated linseed oil and brominated peanut oil, whereby said organic bromine compound acts as an antimetabolite of chlorides thus reducing the tendency of said microorganism to produce chlorotetracycline and resulting instead in the production of mainly tetracycline.

2. In a method of producing tetracycline, the step of cultivating a microorganism selected from the group consisting of *Streptomyces aureofaciens* and *Streptomyces viridifaciens* in a nutrient medium containing a bromo-methane sulfonate, whereby said bromo-methane sulfonate acts as an antimetabolite of chlorides thus reducing the tendency of said microorganism to produce chlorotetracycline and resulting instead in the production of mainly tetracycline.

3. In a method of producing tetracycline, the step of cultivating a microorganism selected from the group consisting of *Streptomyces aureofaciens* and *Streptomyces viridifaciens* in a nutrient medium containing tetrabromophenolphthalein, whereby said tetrabromophenolphthalein acts as an antimetabolite of chlorides thus reducing the tendency of said microorganism to produce chlorotetracycline and resulting instead in the production of mainly tetracycline.

4. In a method of producing tetracycline, the steps of adding elementary bromine to a nutrient medium containing a microorganism selected from the group consisting of *Streptomyces aureofaciens* and *Streptomyces viridifaciens* and also containing a non-toxic organic compound having at least one double bond and being adapted to form a corresponding organic bromine compound wherein the bromine is linked by a covalent bond so as to form such organic bromine compound in situ; and cultivating said microorganism in the presence of said organic bromine compound, whereby said organic bromine compound acts as an antimetabolite of chlorides thus reducing the tendency of said microorganism to produce chlorotetracycline and resulting instead in the production of mainly tetracycline.

References Cited in the file of this patent

UNITED STATES PATENTS

| 2,739,924 | Manlius et al. | Mar. 27, 1956 |
| 2,923,668 | Goodman et al. | Feb. 2, 1960 |

FOREIGN PATENTS

| 209,646 | Australia | July 30, 1957 |